UNITED STATES PATENT OFFICE.

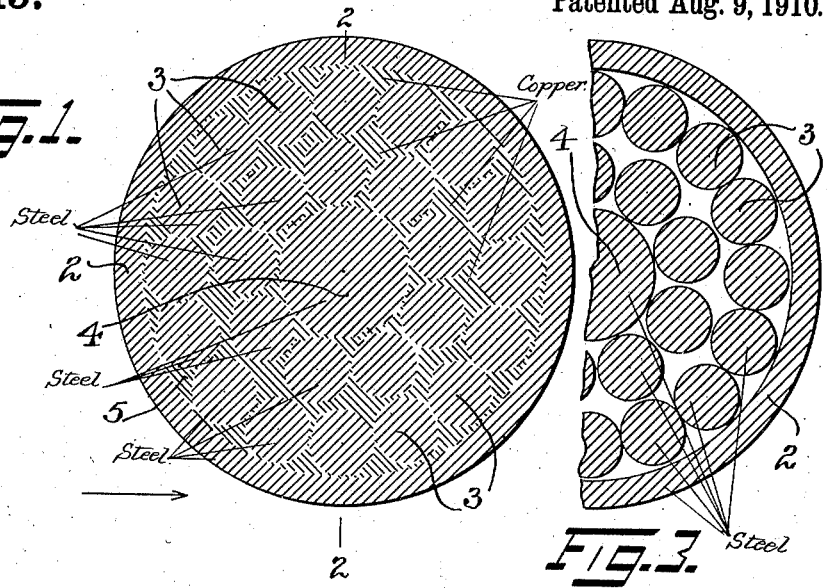
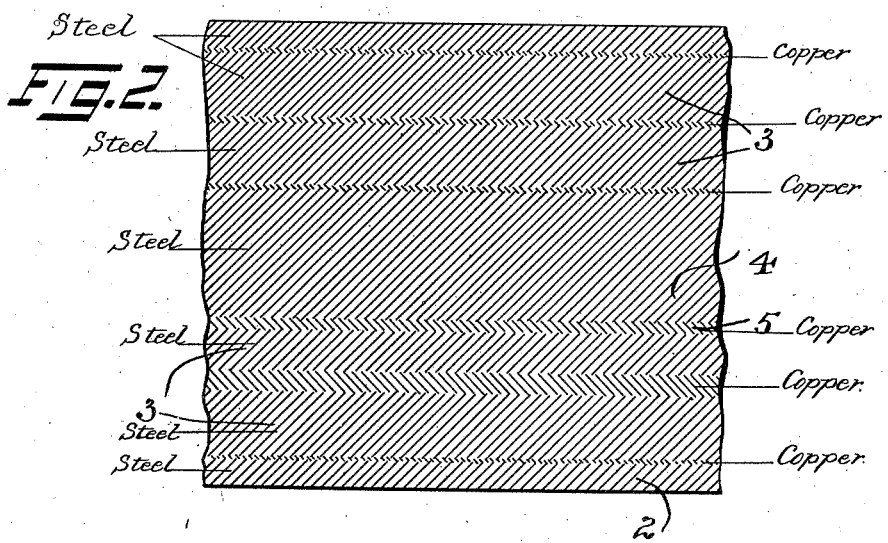

WILLIAM SPEIRS SIMPSON, OF LONDON, ENGLAND, ASSIGNOR, BY MESNE ASSIGNMENTS, TO UNITED STATES CARBO-WELDING COMPANY OF DELAWARE.

SHAFT.

967,145.  Specification of Letters Patent.  Patented Aug. 9, 1910.

Original application filed April 12, 1907, Serial No. 367,840. Divided and this application filed January 16, 1908. Serial No. 411,055.

*To all whom it may concern:*

Be it known that I, WILLIAM SPEIRS SIMPSON, a subject of the King of Great Britain, residing in London, England, have invented certain new and useful Improvements in Shafts, of which the following is a specification.

The present improvement relates to shafts made up of unlike metals, such as soft and hard metals, that is, metals of different kinds or characteristics or which fuse at different temperatures, and especially such for instance as iron or steel and copper, welded together without the use of a flux as ordinarily understood and without pressure.

The present improvement contemplates the manufacture of shafts of all kinds, axles for various purposes, rods, bearings and similar articles wherein it may be desirable to unite hard and friction resisting exteriors with more elastic or less brittle interiors or centers, by building them up of steel or iron and a relatively more ductile or mobile metal, or both, such component parts being welded together so that the strength of each member is joined to the strength of the other thereby to provide an integral structure and cause such welded metals to have the characteristics and qualities which might pertain to a corresponding structure made integral of one metal, but consisting of some metal having a lesser stability or strength than the steel component and a greater stability or strength, or both, than the intermediate ductile component.

The present improvement consists of shafts and other articles of the character specified, either hollow or solid, made up of unlike metals united as permanently for example as welded layers of iron or steel, and since this perfect union of iron or steel is usually designated as and generally understood to be a "weld," and because this term "weld" is the one which by those skilled in the art is most naturally applied to such a union, I have also designated herein the union which is obtained between the unlike metals by the term "weld," although it is to be understood that I do not thereby limit or confine myself to any particular theory as to the actual nature of the union of such unlike metals, although I apprehend that since tests have demonstrated the impossibility of wedging the copper from the steel, the steel itself separating one part from another rather than the copper separating therefrom, there is a molecular interpenetration of the metals and what may be considered a perfect or true weld between such unlike metals, as distinguished from the mere adhesion, as by soldering or sticking together, of metals, which latter lack the mechanical qualities and efficiency which would naturally belong to a strictly integral member. By means of the procedure set forth in this case it has been found practicable, it is believed for the first time in the history of these arts, to construct a built up shaft or axle in such a reliable manner that it becomes superior in mechanical qualities and efficiency to a shaft or axle made of one metal.

As a preface to a further description of the present improvement, it may be said that it is generally admitted by those familiar with matters of this kind that the welding of copper and steel, or other unlike metals, has not up to the present invention been considered possible, although I am aware that it has been sometimes alleged that such results have been obtained. But experience has proven that such so-called welding was but mere adhesion of one unlike metal to another, and not a welding or a molecular interpenetration of one metal with the other, and consequently one metal could be stripped from the other by means of a cold chisel or wedge, although for some purposes, such as copper and steel, for instance, might adhere sufficiently together to permit them to be used so long as there was no sufficient stripping or other separating force used to strip or separate one metal from the other. It is, however, also admitted by those familiar with this art that I have succeeded in welding unlike metals, such for instance as copper and steel, and in consequence I am able to provide an improved shaft or axle having the characteristics hereinbefore mentioned.

In carrying out the present improvement the shafts or axles may be made up in various ways. One of such embodiments is exemplified in the drawings, which illustrate a shaft or axle made up of rods inclosed within a tube or shell, and which rods surround a core or center in the for mof a rod of larger diameter, intermediate which rods the unlike metal or copper is placed, and the whole welded together through the medium of such unlike metal.

In the drawings accompanying and forming part of this specification, Figure 1 illustrates a cross section of a solid integral shaft or axle made in the manner last described; Fig. 2 is a longitudinal sectional view taken in line 2—2, Fig. 1; Fig. 3 is a cross sectional view of a portion of the shaft or axle shown in Fig. 1 before the copper is inserted between the rods and shell; and Fig. 4 illustrates, on a small scale, a sectional view of a rod or shaft made up of a plurality of rods (three) welded together by an unlike metal and without an outer shell or tube.

Various modes of incorporating the unlike metal or copper with the steel may be used, as for instance, by pouring such unlike metal or copper while in a molten condition between the rods, or by placing such metal in a suitable form, as for instance in plate or block form, or in granular form, on the ends of the shaft and bringing such unlike metal to a molten condition, so that it will flow between the rods and fill in the spaces or interstices around such rods.

In some cases the outer surface of the shaft may be protected from corrosion or deterioration by coating it with an unlike non-corrosive metal, such as copper, which is also welded to the metal of which the shaft is made up.

In Figs. 1 to 3 of the drawings, which are merely illustrative, the outer shell 2 of steel has inclosed therein a number of rods 3, also of steel and of the desired diameter, which rods are in this instance shown of circular form although other shapes could be used, and located around a core 4 of steel of somewhat larger diameter than the rods, the unlike metal or copper 5 welding the rods thereto and to each other. In these views the rods are shown forming into layers alternately with layers of unlike metal, so that the built up shaft may be said to comprise alternate layers of unlike metals. Fig. 4 illustrates the same form of shaft, except that the outer shell and core are omitted.

One of the advantages of the present improvement is that the shaft may be made up of a relatively rigid and a more ductile metal, and this may be not only in the manner shown in the drawings, but the shaft may be made up of different kinds of steel along with copper or other unlike metal, whereby it will have a certain amount of elasticity in use which cannot be obtained with a solid shaft made up of one metal.

It is to be understood that within the scope of the present improvement is the manufacture of various forms of shafts, axles or similar articles made up of united or welded unlike metals, such as hard and soft metals, or metals which fuse or melt at different temperatures, such as aluminum, copper, tin, lead, zinc, and their various alloys, which comprise in part the softer metals and melt at low temperatures, and steel or iron, which melt at higher temperatures and comprise in part the harder metals, and that the term "shaft" as used herein and in the claims is intended to include an axle or any other article having the same general shape or formation, hollow or solid, and however put together or made up. In the manufacture of theses shafts I bring into contact in any suitable way the surfaces of the requisite pieces of unlike, such as hard and soft, metals which are to be united, joined or welded together, either by winding them into the desired form, or, as shown in the drawings, by making the shaft up of rods, or of rods and tubes. The whole are then suitably held or clamped in the desired position, either with the unlike metal placed in the manner hereinbefore described or placed in wire, rod or strip formation, between the steel or other rods, and the structure so made up is then incased, covered or enveloped on all sides, and inside and out if a tubular shaft, with a composition or paste made up of a carbonaceous material, such for instance as ground coke, charcoal or other form of carbon as pure as possible and mixed with water and a suitable binding material, such as treacle, sugar, starch, flour, or other similar substance, preferably such as may be soluble in water and having the properties of binding with water and, when calcined, of forming a reasonably pure, coherent coke. This carbonaceous covering or envelop may either be formed into a mold to fit the mass of metal assembled for welding and which after being suitably dried may be used to envelop the structure while being heated; or the metals to be welded may be placed in a suitable receptacle, such as a fire resisting crucible or a metallic vessel, with or without a cover, and the carbonaceous paste may be tightly packed around the same on all sides, after which the entire mass of metals, carbonaceous covering or packing and receptacle are subjected to sufficient heat, either in a muffle or other furnace, or in a bath of molten metal, such as pig iron, to fuse or melt the softer but not the harder metal. Under the said conditions, and when subjected to a temperature sufficient to melt the softer metal, the carbonaceous casing or envelop prepared as aforesaid provides a reducing agent or atmosphere which effectively deoxidizes the surface of the harder metal, which requires no other preparatory pickling or cleaning, and also prevents the oxidation of the softer metal while molten, so that in a brief space of time after fusing the latter becomes firmly joined, united or welded to and with the harder metal at every point of contact, in all cases there being an appreciable infiltration of a portion of the softer metal into the harder metal in contact therewith. The carbonaceous paste prepared as aforesaid also forms an efficient mold to retain in the desired position and prevent the escape of the softer metal while in a molten condition.

In some cases, especially when the softer metal used is copper, it is desirable to add to the carbonaceous paste a small quantity of zinc or zinc filings, the presence of which is advantageous for the prevention of blow holes in the copper surface while cooling.

In some cases the rods or tubes, or sheet windings of steel or iron which are to be joined by the interposed welding material, such as copper or brass, may be spaced or kept at the desired distance from each other by inserting between the same suitable spacing disks or rivets of steel to prevent the softer metal or welding material from being squeezed out or displaced while in a molten condition by the weight or pressure of the rods or members to be joined, united or welded.

In some cases when it is desired to join, unite or weld together the several members to form a composite structure of iron or steel, such members may be assembled or arranged and suitably spaced and clamped or otherwise held in their desired relative positions and a quantity of the softer metal or welding material, sufficient to accomplish the desired union or welding, may be placed either in solid or granular form on the end of the assembled members of harder metal, and the entire mass then covered or enveloped in the carbonaceous paste hereinbefore described and subjected to heat in such a manner that the softer metal when fused or melted will flow down and fill the spaces between or interstices of the mass of harder metals underneath and so accomplish the desired union or welding together of such parts. Or in some cases the harder metals or rods may be clamped in the desired relative positions and the structure covered or enveloped with the hereinbefore described carbonaceous paste, and while being subjected to the necessary heat the copper, brass or other softer metal with which it is desired to weld together the members of harder metal may be introduced in a molten condition and brought into contact therewith in any convenient manner so as to flow down and fill up the interstices or prearranged spaces intended to receive the same between the wound sheets or rods or members of hard metal. A simple method of such introduction is, when enveloping or covering the mass with the covering of carbonaceous paste to so place a plumbago crucible, having a cover, on the end of the mass of assembled metals that from a small hole or orifice in the bottom of such crucible, which must be stoppered until the moment when the soft metal or welding material is to be released therefrom, the molten metal when poured therein may flow into the spaces between the harder metal members or rods and join, unite or weld the same firmly together, or in some cases may form a coating of the softer metal upon the harder outer metal surface in a suitably prepared mold of the carbonaceous paste hereinbefore described.

In some cases a paste may be employed that is lacking the requisite carbon, or of refractory character, such as graphite, in which event the metals or rods to be welded or united may be placed in a crucible or other suitable receptacle having a cover, which may be luted or otherwise fastened thereon, and the enveloping material placed around such shaft and the receptacle hermetically sealed, and while being subjected to heat carbonic oxid may be introduced into the crucible under pressure by means of a tube passing through the cover thereof and through the enveloping material, so that the gas may be brought into contact with the metals under the conditions required to provide a reducing or deoxidizing atmosphere suitable for the accomplishment of the desired result. In like manner, the members or rods of the harder metal making up the shaft may be enveloped or covered with a paste the chief ingredient whereof may be graphite or other material so refractory or low in carbon as to require the additional presence of carbonic oxid introduced as above mentioned, and the copper, brass or other softer metal or welding material may be introduced in molten form and brought into contact with the harder metals in the manner hereinbefore described. And thus, in a number of different ways this improved shaft or axle, made up of a hard and friction resisting exterior with a more elastic or less brittle interior or center, of welded unlike metals may be formed by subjecting the rods or members forming the structure to a material effective to cause, as I apprehend, the molecular interpenetration of one metal with the other while one is being brought to or is in a molten condition.

The present application is a divisional one of my application Serial No. 367,840, filed April 12, 1907, for improvement in method of uniting or welding metals.

I claim as my invention:

1. A structure of the character described, made up of steel rods, a steel shell inclosing the same, and copper welded together.

2. A structure of the character described, comprising an outer shell and a plurality of members therein made up of steel and copper all welded together.

WILLIAM SPEIRS SIMPSON.

Witnesses:
H. D. JAMESON,
F. L. RAND.